Aug. 7, 1962     H. TROEGER ET AL     3,048,364

TURBINE BRAKE

Filed May 27, 1957

*INVENTORS*
HENRY TROEGER
EDWARD J. CLINTON JR.
BY
*Robert W. Ely*
ATTORNEY

United States Patent Office 3,048,364
Patented Aug. 7, 1962

3,048,364
TURBINE BRAKE
Henry Troeger, Cooperstown, and Edward J. Clinton, Jr., New Hartford, N.Y., assignors to The Bendix Corporation, a corporation of Delaware
Filed May 27, 1957, Ser. No. 661,659
9 Claims. (Cl. 253—59)

The present invention relates to power devices having a gas-driven high speed turbine wheel and more particularly concerns turbine-driven starters for aircraft turbine engines.

In a turbine-driven starter for aircraft turbine engines, there have been instances of failure of the governing device which maintains a safe relation between the impulse force to the turbine wheel and the load being driven. The governor normally prevents excessive speed of the turbine when under no load. For example, in a turbine starter which is powered by combustion gases, the governor is actuated at a predetermined speed (about 44,000 r.p.m.) to interrupt the flow of fuel and air to the combustion chamber. If the governor fails to so operate, with the starter under no load after start-up, the turbine wheel can rapidly attain what is commonly known as a "run-away" condition. In extreme cases of this condition, when the stresses induced in the turbine wheel by high rotational speeds exceeds the strength of material, a disintegration of the turbine wheel results which is characterized by the ejection at high speeds of the blades of the turbine wheel and sometimes wheel throw-out. This extremely dangerous condition is, of course, destructive of equipment and hazardous to nearby personnel.

The primary object of the present invention is to prevent the aforenoted hazard by providing improved means which sense a condition of extreme speed and then imposes a restraining force on the turbine wheel whereby a disintegrating speed is prevented.

A further object is the provision of emergency braking means which mechanically senses extreme speed and then applies a braking action against the side of the turbine wheel.

Another object is the provision of an improved, compact turbine section for an aircraft starter which has centrifugally-actuated cutting blades carried by the turbine and a brake shoe structure having a thin wall which is cut by the blades whereby a spring-biased clutch-backed brake shoe rubs against the side of the turbine.

An additional object is the provision of means for confining the turbine wheel if the turbine shaft is broken.

Figure 1:
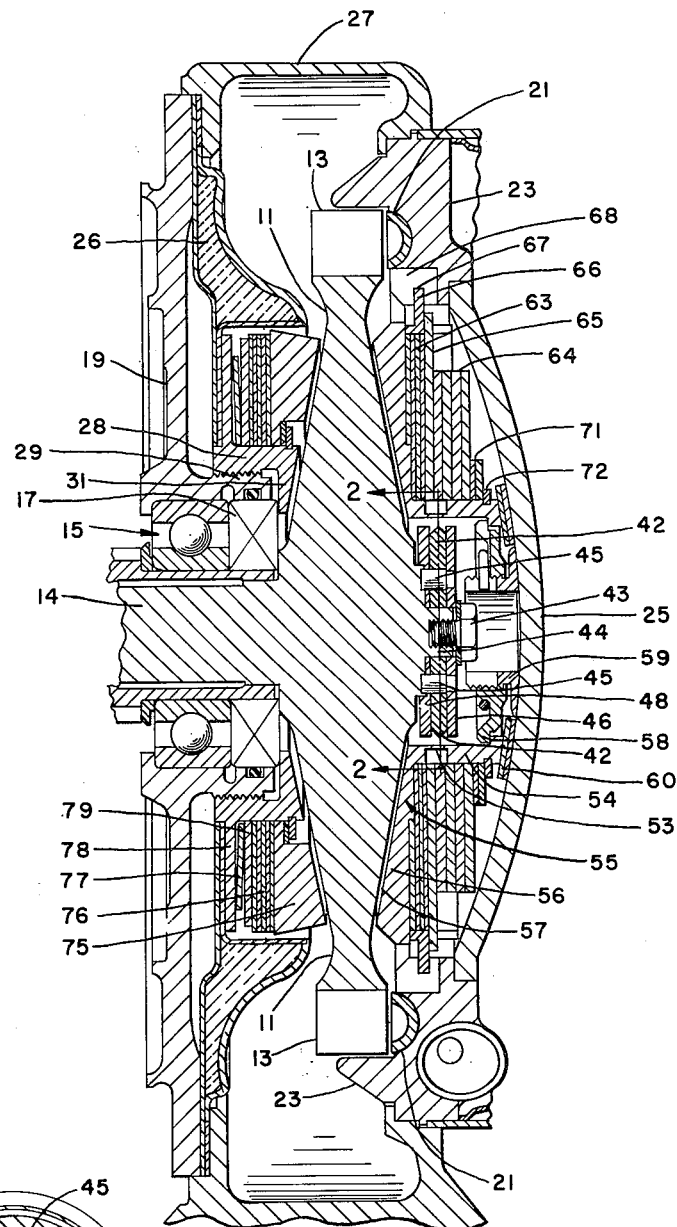
Figure 2:
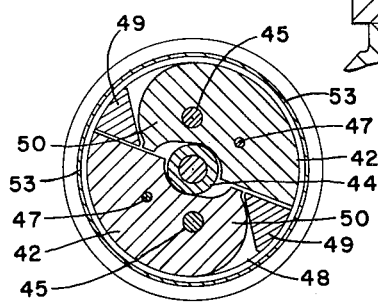

The accomplishment of the foregoing objects and others, along with the advantages and features of the invention, will be apparent from the following detailed description of the preferred embodiment of the invention and the accompanying drawings in which:

FIGURE 1 is a longitudinal cross-sectional view of the turbine section a combustion starter embodying the invention; and FIGURE 2 is a transverse cross-sectional view along the line 2—2 of FIG. 1 and shows the centrifugally-actuated cutting mechanism for releasing the mechanical brake shown at the right side of the turbine wheel in FIG. 1.

In FIGURE 1, it can be seen that the axial flow impulse type turbine wheel 11 having peripheral blades 13 and an integral shaft 14 is mounted by its shaft in bearings 15. The bearings have a diagrammatically-illustrated annular seal 17 and are supported by the transverse housing wall 19. Two brake devices are mounted at each side of the turbine wheel 11 and will be described hereinafter.

Combustion gases from the combustion chamber (not shown) are directed against the turbine brackets or blades 13 by nozzles 21 which are mounted in annular nozzle ring 23. The nozzle ring 23 has attached thereto the concave circular wall 25 of the combustion chamber whereby transverse wall means are formed at the side of the turbine which is opposite the turbine shaft and mounting. The gases which drive the turbine and leave the turbine blades 13 are deflected by an annular heat insulating shield 26 towards the exhaust shroud 27. An annular exhaust chamber is formed by shield 26, exhaust shroud 27 and nozzle ring 23. The gases are discharged through an exhaust shroud port which is not shown. It is to be noted that the heat shield 26 is clamped between the exhaust shroud 27 and the transverse housing wall 19 and is interiorly attached to an annular bearing retainer 28 which is threaded on an axial tubular extension 29 of the housing wall 19. An inwardly-extending flange 31 of the retainer 28 retains the bearing seal 17. The turbine shaft 14 is connected by splines to a member of the initial stage of reduction gearing (not shown). The reduction gearing is operably connected through conventional means (not shown) to an aircraft turbine engine so that the high speed starter turbine can bring the aircraft turbine engine up to starting speed. At this speed, a governor normally stops the supply of combustion gases and the starter jaw dis-engages. The combustion gases are provided by an air bottle and a fuel tank (not shown). Such a system and the controls therefor are shown in U.S. Patent No. 2,742,759, dated April 24, 1956, issued to Flanigen et al. It is to be noted that the combustion chamber wall 25, the nozzle ring 23, the exhaust shroud 27, the housing wall 19 and the arangement for mounting the turbine only at one side provide a compact turbine section in a combustion starter.

The stainless steel turbine wheel 11 of wedge-shaped cross-section has axially mounted thereon, at its right side, an assembly which consists essentially of a carrier structure and two centrifugally-actuated cut-off blades 42 which function to release a brake shoe, hereinafter described. The carrier is attached to the turbine by a screw 43 which threads into an axial extension 44 of the turbine. The two cut-off blades 42 are pivoted on two pins 45 which are mounted in recesses in the right face of the turbine and in an opening in the right wall 46 of the carrier structure. This structure has another wall 48 abutting the other side of the cut-off blades and the central face of the turbine.

In FIGURE 2, certain features of the cut-off assembly appear more clearly. It can be noted that the blades 42 which are pivotally mounted on pins 45 are restrained from centrifugal movement by shear pins 47. The two transverse washer-like walls 46, 48 of carrier structure are connected by longitudinally-extending parts 49 of triangular cross section. It is to be noted that the cutter blades 42 will pivot outwardly about pivot pins 45 when a predetermined centrifugal force exists which is sufficient to shear the small shear pins 47. If for any reason one cutter blade is released before the other, the tang or short extension 50 of the blade (which is pivoted radially inwardly) will contact the other blade and exert additional force for the shearing of the restraining shear pin 47. The total travel of the cut-off blades 42, 43 is controlled by the travel of the radially inner and curved part of the tang 50 since it will contact the axial extension or pilot stub 44 of the turbine wheel after a predetermined inward travel. It is to be noted that the extended cutting edges cut rapidly through the thin wall 53 since they contact continuously most of the thin wall.

Referring again to FIGURE 1, it can be seen that the cut-off blades 42 when rotated radially outwardly by centrifugal action will cut the annular reduced section 53 of an annular segment 54 of the brake shoe structure 55. The brake shoe structure 55 also has a transversely-extending annular part or brake shoe 56 which has an inclined annular rubbing surface 57. This large surface is closely spaced to the adjacent complementary-inclined surface of the radially-intermediate part of the turbine wheel 11. The brake shoe structure 55 has as an intergral part, the aforenoted tubular axially-extending segment or part 54 which is constructed with the aforenoted thin wall or reduced section 53. The right end of the tubular part 54 is attached by a flange to the concave combustion chamber wall 25 by means of a lock nut 58 threaded on to an axial tubular extension 59 which is welded to the combustion wall 25. Shims 60 are provided to adjust the clearance between the inclined surface of the turbine wheel and the brake shoe surface 57. The shims 60 allow for positioning so as to provide for normal heat distortion of the component parts without developing contact.

The brake assembly additionally includes a pack of annular clutch-type discs 63 and an arrangement of compressed Belleville springs 64 to provide the axial braking force. The large clutch discs are alternated annular washer-like rings of dissimilar material, such as a chrome-plated stainless steel and an oxidized nickel-chrome alloy (Monel). These discs 63 are confined between the brake shoe 56 and an annular washer-like ring or static back-up plate 65. The outer most part of the washer-like ring 65 has welded thereto, on the left side, an annular positioning and guide ring 66 which has a plurality of equi-spaced teeth 67 fitted into corresponding closely-fitting longitudinal grooves 68 in the nozzle ring 23. Guide ring 66 encases the discs 63 and also abuts the outermost part of the right surface of the brake shoe 56. The Belleville springs 64 are compressed against washer-like ring 65 by means of washer 71 and snap ring 72 which fits into a groove in the tubular extension 54 of the brake shoe structure 55. It is apparent that, when the cut-off blades 42 are pivoted outwardly a pre-determined distance which is just sufficient to sever the reduced section 53, the Belleville springs 64 will urge the stainless steel brake shoe 56 into contact with the entire side of the turbine and that the axial movement will be guided by the teeth 67 sliding in the recesses or grooves 68. Furthermore, the tabs or teeth 67 also prevent rotation of the back-up plate 65 so that the braking action is augmented.

At the inclined side surface of the turbine 11 which is adjacent its mounting, there is a substantially-axially-fixed brake assembly which is comprised of a brake shoe 75, a disc pack 76 and a preloaded Belleville spring 77. These components of the back-up brake mechanism are held in position by snap ring which is mounted in a groove in retainer 28 and are mounted on the member 28 which is threaded on the axial extension 29 of the housing wall 79. It is to be noted that the smaller brake shoe 75 also has an inclined surface which complements the adjacent or closely spaced inclined surface of the turbine wheel. The Belleville spring 77 bears against a radially outward-extending flange 78 which is an integral part of the annular bearing retainer 28 and against a washer 79 which abuts the disc pack 76. The annular stainless steel brake shoe 75 together with the previously described axially-movable brake shoe 56 provide means for confining or restraining the turbine wheel in the event the turbine wheel shaft is broken adjacent the turbine due to the malfunctioning of the parts which it drives or of the bearings on which it is mounted. Braking by shoe 56 in extreme cases may adversely affect the bearings. The disc pack 76, which is also comprised of the stainless steel and Monel discs stacked in series, permits rotation of the brake shoe 75 and provides large surface areas for the absorption of heat. It is to be noted that with both disc packs 63, 76 the velocity of each disc sequentially from the rotating brake shoes to the static washer-like members is gradually less.

In operation, the centrifugal force developed by the cut-off blades 42 at a predetermined speed (about 55,000 r.p.m.) is sufficient to shear the restraining pins 47 and to cause the cut-off blades to swing out on their respective pivot pins 45. This action occurs when the governing device fails and the turbine wheel is started toward "runaway" speed because the flow of the impulse-producing media has not been properly controlled by the governor. This lack of control can occur after the starter jaw is retracted or if the starter jaw does not engage the engine jaw during starting. When the blades 42 swing out, their extended pointed cutting edges contact and rapidly shear through the reduced section 53 of the brake shoe structure 55. This action permits the Belleville springs 64 to unload and force the severed brake shoe 56 against the side of rapidly-rotating turbine wheel 11. It is to be noted again that the total travel of the cut-off blades is limited by means of their tangs 50 so that the wider part of the blades does not project between the ends of the severed reduced portion and cause interference. When the turbine rubs against the inclined surface 57 of the brake shoe 56, it is apparent that the large-surfaced disc pack 63 will also absorb heat energy and that there will be an incremental lower velocity of each disc sequentially from the turbine wheel toward the static back-up ring 65. In tests, the brake shoe 56 stopped the turbine without damage to the turbine shaft or combustion wall. Only the brake assembly and the turbine side were damaged. In the event the turbine wheel is broken, brake 75 and disc pack 76 provide confinement and heat-absorbing braking at the left side of the turbine.

From the foregoing, it is apparent that a brake device has been provided which results in an essentially fail-safe condition, whereby turbine buckets or a turbine wheel are not thrown out through the housing. It is to be noted that the actuating mechanism having the cutting blades is directly connected to the turbine and is centrifugally actuated so that the higher the speed of the turbine the greater the force generated to operate the cut-off blades. Another noteworthy feature is the arrangement of the discs which provided large-surfaced energy-absorbing members in addition to the brake shoe.

It is to be understood that changes can be made in the preferred embodiment by persons skilled in the art, without departing from the invention, as set forth in the appended claims.

What is claimed is:

1. In a turbine assembly having a turbine wheel and a housing surrounding the wheel, an emergency braking system comprised of brake means within the housing for braking said turbine wheel by contact therewith, spacing means connected to the housing rigidly spacing said brake means away from said turbine wheel, means carried by said turbine wheel arranged to release said spacing means when said turbine wheel is rotated at excessive speed, spring means confined by said spacing means and said housing and arranged to urge said brake means against said turbine wheel when said spacing means is released.

2. In a turbine assembly having a turbine wheel, an emergency braking system comprised of brake means including a large rubbing surface for braking said turbine wheel by contact with the side thereof, spacing means rigidly spacing said brake means away from said turbine wheel, means carried by said turbine wheel arranged to release said spacing means when said turbine wheel is rotated at excessive speed, and means including energy absorbing plates and a spring device arranged to urge said brake means axially against said turbine wheel when said spacing means is released.

3. A turbine assembly comprised of turbine wheel having a radially-intermediate transverse surface, a housing encasing said turbine wheel, an annular brake shoe having a surface uniformly spaced from said surface of said turbine wheel, said brake shoe being rigidly attached to said housing by means including a thin axially-extending wall, cutter means carried by said turbine wheel and constructed and arranged to cut through said thin wall when said turbine wheel rotates at excessive speed, and spring means arranged to urge said brake shoe into contact with said turbine wheel at said surfaces when said thin wall is cut.

4. A turbine assembly comprised of an axial-flow impulse type wheel having a radially-intermediate transverse surface, a housing encasing said turbine wheel, an annular brake shoe having a surface uniformly spaced from said surface of said turbine wheel, said brake shoe being rigidly attached to said housing by means including a thin axially-extending wall, cutter means carried by said turbine wheel and constructed and arranged to cut through said thin wall when said turbine wheel rotates at excessive speed, spring means arranged to urge said brake shoe into contact with said turbine wheel at said surfaces when said thin wall is cut and a static back-up plate and an energy absorbing disc pack in series between said spring means and said brake shoe.

5. A turbine assembly comprised of turbine wheel having radially-intermediate transverse surface, a housing encasing said turbine wheel, an annular brake shoe having a surface uniformly spaced from said surface of said turbine wheel, said brake shoe being rigidly attached to said housing by means including a thin axially-extending wall, cutter means carried by said turbine wheel and constructed and arranged to cut rapidly through said thin wall by extended contact therewith when said turbine wheel rotates at excessive speed, spring-biased means including a heat-absorbing disc pack arranged to urge said brake shoe into contact with said turbine wheel at said surfaces when said thin wall is cut and said cutter means including centrifugally-actuated cutting blades which are restrained by small shear pins and are arranged for limited radially-outward movement.

6. In a turbine assembly, the improvement comprising a front transverse wall means having gas nozzles in the periphery thereof, a brake shoe structure rigidly attached to the central part of said transverse wall means, said brake shoe structure including an axially-extending annular portion and a brake shoe having a transverse rubbing surface, said annular portion extending from said brake shoe toward the central part of said transverse wall, said axially-extending portion having a thin annular shear wall, Belleville spring means mounted on said axially-extending portion and compressed between a restraining washer adjacent said transverse wall means and a static back-up plate, a disc pack abutting said transverse brake shoe, and said back-up plate, a rotatably-mounted turbine wheel having a side surface adjacent said brake shoe and arranged to be rotated by gases from the gas nozzles in said transverse wall means, said turbine having an extension projecting into the interior of said axially-extending portion of said brake shoe structure, said turbine wheel extension carrying centrifugally-actuated cutters which are arranged to sever said shear wall of said annular portion, said cutters being constructed so that their radially-outward movement is limited so that they do not project outwardly beyond the extent necessary to cut said shear section.

7. An aircraft engine starter comprised of a front transverse wall means having gas nozzles in the periphery thereof, a brake shoe structure rigidly attached to the central part of said transverse wall means, said brake shoe structure including an axially-extending annular portion and a brake shoe having inclined annular rubbing surface, said annular portion extending from said brake shoe toward the central part of said transverse wall, said axially-extending portion having a thin annular shear wall, Belleville spring means mounted on said axially extending portion and compressed between a restraining washer adjacent said transverse wall means and static back-up plate, a disc pack abutting said transverse brake shoe, a rotatably-mounted turbine wheel having an outwardly-converging radially intermediate part and arranged to be rotated by gases from said gas nozzles in said transverse wall means, said rubbing surface being uniformly spaced from one side of said radially intermediate part of said turbine wheel, said turbine wheel having an extension projecting into the interior of said axially extending portion of said brake shoe structure, said turbine wheel extension carrying centrifugally-actuated cutters which are arranged to sever said shear wall of said annular portion, said cutters being constructed so that their radially-outward movement is limited by contact with said turbine wheel extension so that they do not project outwardly beyond the extent necessary to cut said shear section, said back-up plate having tabs projecting into axially extending recesses in said wall means, a back-up brake assembly at the side of said turbine wheel opposite said brake shoe structure, said back-up brake assembly including a spring-biased disc pack and a member constructed to provide an extended inclined annular surface which is uniformly adjacent the other side of said turbine, and said back-up brake assembly being carried by rigid wall structure in which said turbine wheel is rotatably mounted.

8. In a turbine assembly, the combination comprising a turbine wheel having central outwardly-converging surfaces, said turbine wheel being carried by a rotatably-mounted shaft, a brake shoe device mounted at one side of said turbine wheel, said brake shoe device being axially-movable and having an annular surface closely and uniformly spaced from one side surface of the central part of said turbine wheel, a back-up brake mechanism mounted at the other side of said turbine wheel, said back-up brake mechanism providing a rotatable, axially-restrained annular surface uniformly adjacent said other side surface, whereby, if said turbine wheel breaks away from its shaft, said wheel will be restrained by brake shoe device and said back-up brake mechanism.

9. In a turbine assembly, the combination comprising a turbine wheel having a central part of wedge-shaped cross-section, said turbine wheel being carried by a rotatably-mounted shaft, a brake shoe structure mounted at one side of said turbine wheel operable when said turbine wheel rotates at excess speed, said brake shoe structure including a clutch disc pack and Belleville spring means, and a back-up brake mechanism mounted at the other side of said turbine wheel, said back-up brake mechanism providing a surface adjacent said other side surface and including a spring-biased clutch disc pack, whereby if said turbine wheel breaks away from its shaft, said wheel will be restrained by the brake shoe device and said back-up brake mechanism.

References Cited in the file of this patent

UNITED STATES PATENTS

| | | |
|---|---|---|
| 1,302,060 | Loewenstein | Apr. 26, 1919 |
| 1,578,867 | Taylor | Mar. 30, 1926 |
| 1,591,937 | Earle et al. | July 6, 1926 |
| 1,600,346 | MacMurchy | Sept. 21, 1926 |
| 2,382,108 | Seewer | Aug. 14, 1945 |
| 2,407,454 | Seewer | Sept. 10, 1946 |
| 2,733,891 | Millins et al. | Feb. 7, 1956 |

FOREIGN PATENTS

| | | |
|---|---|---|
| 994,318 | France | Aug. 8, 1951 |
| 736,032 | Great Britain | Aug. 31, 1955 |
| 167,457 | Great Britain | Apr. 13, 1956 |